United States Patent [19]

Niemi

[11] Patent Number: 4,828,209
[45] Date of Patent: May 9, 1989

[54] DISPLAY VASE FORM

[75] Inventor: Herbert Niemi, North Lima, Ohio

[73] Assignee: Modern Display Plastics, Sebring, Ohio

[21] Appl. No.: 175,692

[22] Filed: Apr. 13, 1988

[51] Int. Cl.$^4$ .............................................. F16L 3/08
[52] U.S. Cl. .............................. 248/221.1; 248/27.8; 248/222.2; 47/41 R; 411/508
[58] Field of Search ............... 248/221.1, 221.2, 221.4, 248/222.1, 222.2, 223.3, 225.2, 220.2, 220.3, 27.8; 47/44, 41.11, 41; 411/508, 509, 510, 40, 41

[56] References Cited

U.S. PATENT DOCUMENTS

| | | | |
|---|---|---|---|
| D. 120,587 | 5/1940 | Hinkins . | |
| D. 140,671 | 3/1945 | Pascal | D58/2 |
| D. 282,152 | 1/1986 | Mendenhall | D11/154 |
| 1,226,101 | 5/1917 | Marsden | 47/41 X |
| 1,970,370 | 8/1934 | Foser | 47/41 |
| 2,887,824 | 5/1959 | Riva | 47/41 |
| 3,089,269 | 5/1963 | McKiernan | 248/221.4 X |
| 3,553,888 | 1/1971 | Daly et al. | 248/224.1 X |
| 3,598,234 | 8/1971 | Gregoire et al. | 209/123 |
| 3,692,469 | 9/1972 | Peace | 21/63 |
| 3,985,324 | 10/1976 | Larson | 248/221.1 |
| 4,123,873 | 11/1978 | Canova | 47/83 |
| 4,305,512 | 12/1981 | Mackenzie | 211/75 |
| 4,375,342 | 3/1983 | Wollar et al. | 411/41 |
| 4,378,889 | 4/1983 | Lebowitz | 211/75 |
| 4,508,303 | 4/1985 | Beckerer, Jr. | 248/311 |
| 4,571,134 | 2/1986 | Beglinger et al. | 411/41 |
| 4,679,695 | 7/1987 | Leff | 211/71 |
| 4,687,094 | 8/1987 | Allsop et al. | 248/221.1 X |

FOREIGN PATENT DOCUMENTS 2065059  6/1981  United Kingdom .

OTHER PUBLICATIONS

Deutsche Goldsmiede-Zeitung; 7/1964; p. 561.

Primary Examiner—Ramon O. Ramirez
Attorney, Agent, or Firm—Calfee, Halter & Griswold

[57] ABSTRACT

A display vase construction for artificial flowers or other items of merchandise includes a perforated display board and a vase form which is removably mounted to the display board. The vase form has a side wall which envelopes approximately 180° and a bottom wall closing the side wall. The display board closes the rear of the vase form and completes an open top vase for displaying articles of merchandise. A pair of hooks extend from the bottom of the vase form and are intended to fit through a pair of perforations in the display board. Fasteners extend outward from the side wall part way up its length. The fasteners engage other perforations in the display board. Each fastener comprises an array of resilient fingers which fit through a perforation in the display board. A relatively rigid camming pin is moveable in an internal passage formed in the array of fingers to deflect the fingers into locking engagement with the perforation to lock the fingers and hence the vase to the display board.

19 Claims, 4 Drawing Sheets

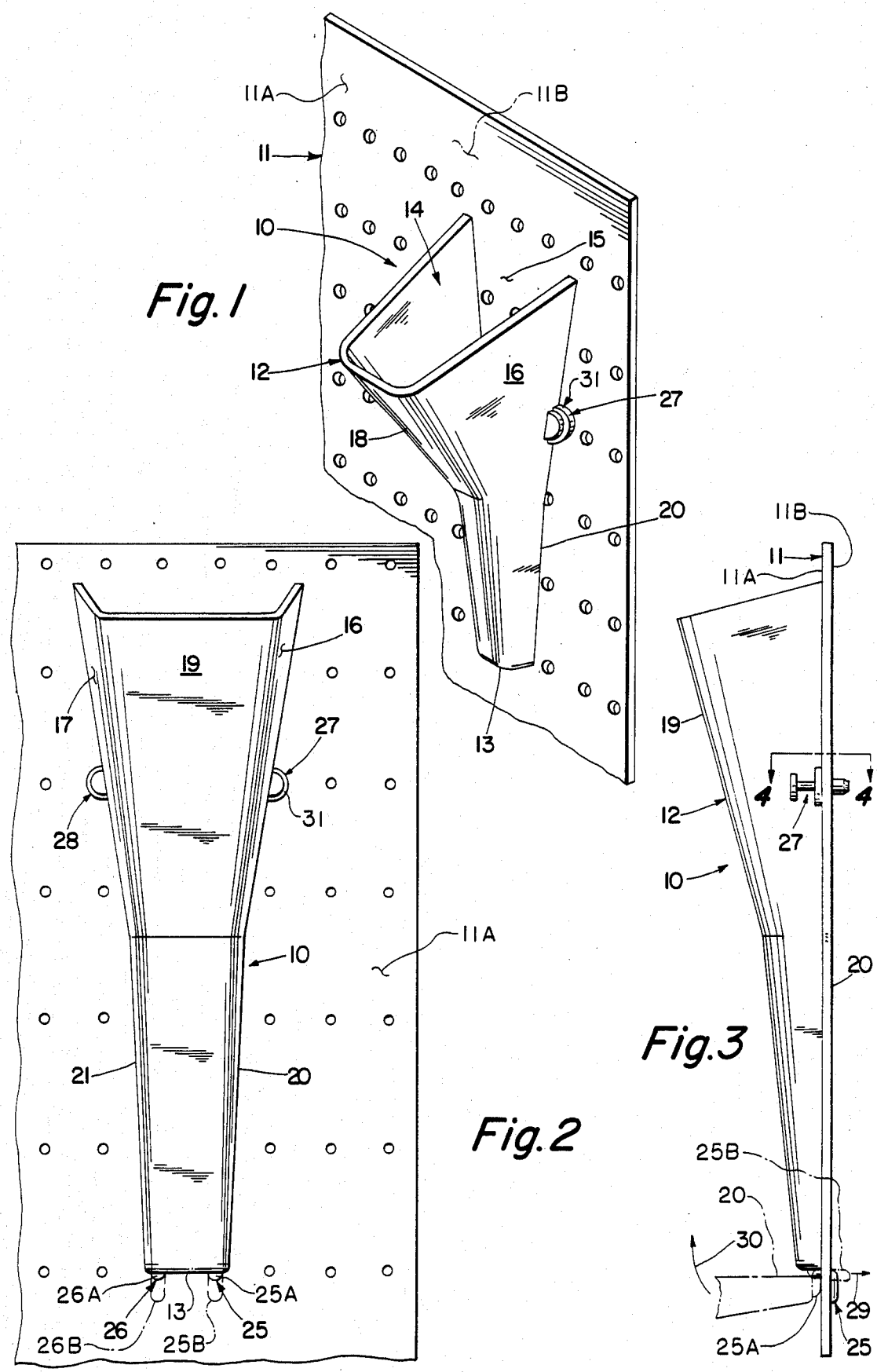

DISPLAY VASE FORM

1. Field of the Invention

The present invention relates to a display vase for flowers or other display items, and particularly to a vase form which is easily attached and reattached to a perforated display board such as a pegboard.

2. Background of Invention

In many retail consumer establishments, it is common to display items from a perforated display board such as a pegboard. For example, Mendenhall U.S. Pat. No. Des. 282,152 shows an artificial flower vase with an hourglass shape and a circular cross section which may be secured to a pegboard with a U-shaped wire clamp. The wire clamp is separate from the flower vase, and enables the flower vase to be located in many positions on the pegboard, depending upon the location of the Perforations in the pegboard. Additionally, there are merchandise displays comprising vase forms attached to a display board to complete an array of open top containers for articles of merchandise. Such vase forms have heretofore been adhesively attached to the display board.

SUMMARY OF THE INVENTION

The present invention provides a merchandise display including a vase form designed specifically for a perforated display board such as a pegboard. The vase form preferably includes a molded plastic article with a curved side wall and closed bottom. The back and top are open, with the back closed by the display board to complete an open top vase for artificial flowers or other items of merchandise.

The bottom of the vase form includes integral hooks designed to engage perforations in the display board to support the bottom of the vase form on the display board. The vase form also includes integral fasteners which releasably attach the vase form to the display board. Specifically, the vase form has integral tabs extending laterally from each of its side walls, and an array of relatively resilient fingers extending from each of the tabs. Each array of resilient fingers is designed to be inserted into a respective perforation in the display board.

A relatively rigid camming pin is associated with each array of resilient fingers. The camming pin is disposed in an internal passage defined by the array of resilient fingers. When the camming pin moves in one direction in the internal passage, it cams the resilient fingers apart, and causes them to engage the sides of the perforation in the display board, thereby locking the vase form in place on the display board. When the camming pin is moved in the other direction in the internal passage, it allows the array of resilient fingers to return to positions which allow the vase form to be removed from the display board.

A typical pegboard-type display board is a generally planar board with rows and columns of perforations extending completely through the board (i.e., from the front to the back surface of the board). In attaching the vase form of this invention to the pegboard, the hooks are initially engaged with a pair of perforations in the pegboard, and generally locate and hold the vase form in position on the pegboard. The tabs and their arrays of resilient fingers are then located so that each array of resilient fingers is aligned with another perforation on the pegboard. A caming pin is then pushed into the internal passage in the array of fingers to spread the fingers and to lock the vase form to the pegboard. The camming pin is removed from the internal passage to enable the vase form to be removed from the pegboard.

BRIEF DESCRIPTION OF THE DRAWINGS

FIG. 1 is a perspective illustration of an improved display vase form constructed in accordance with the present invention and mounted on a conventional pegboard;

FIG. 2 is a front elevation view of the pegboard and vase form of FIG. 1;

FIG. 3 is a side elevation view of the pegboard and vase form of FIG. 2 showing in phantom one step in the process of installing the vase form on the pegboard;

DESCRIPTION OF PREFERRED EMBODIMENTS

Figure 4:
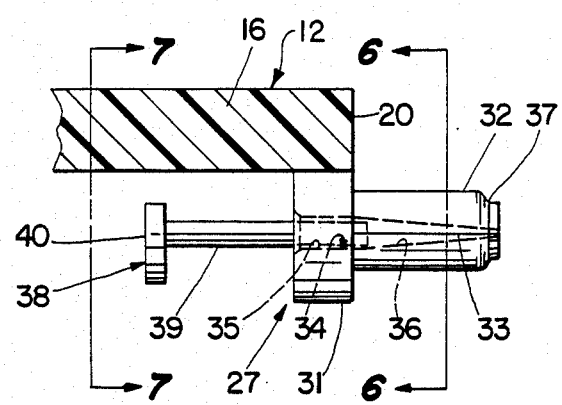
FIG. 4 is a view looking in the direction of arrows 4—4 of FIG. 3 illustrating a tab, resilient finger, and camming pin but with the display board for the vase form removed.

FIG. 1 illustrates a vase form 10 attached to a conventional pegboard or other perforated display board 11. The vase form 10 comprises a resilient, preferably molded plastic article with a curved side wall 12 and a bottom 13. Together the side wall 12 and bottom 13 define an open top 14 and an open back 15. When the vase form 10 is attached to the pegboard 11, the vase form combines with the front surface 11A of the pegboard to complete a vase for displaying articles of merchandise, such as artificial flowers, from the pegboard.

The side wall 12 of the vase form is generally U-shaped in horizontal cross section. The side wall 12 includes opposite side portions 16 and 17 and front portion 18 connecting them. The U-shaped side wall 12 is illustrated as having a circumferential extent of approximately 180°, although the circumferential extent or vase form depth may be varied depending upon the size of the flower or other article being displayed, as long as a generally open side 15 is defined thereby.

In side elevation (FIG. 3), the preferred embodiment of the vase form 10 has a forwardly tilted lip 19 and the side portions 16 and 17 flare gently away from each other toward the top of the vase form. However, the vase form can also have other shapes. For example, the side wall 12 could be semicylindrical. Further, it is contemplated that the back wall need not be entirely formed by the pegboard. For example, a vase form for artificial flowers could be provided with a partial back extending between the rearmost edges 20 and 21 of side portions 16 and 17, respectively.

Figure 8:
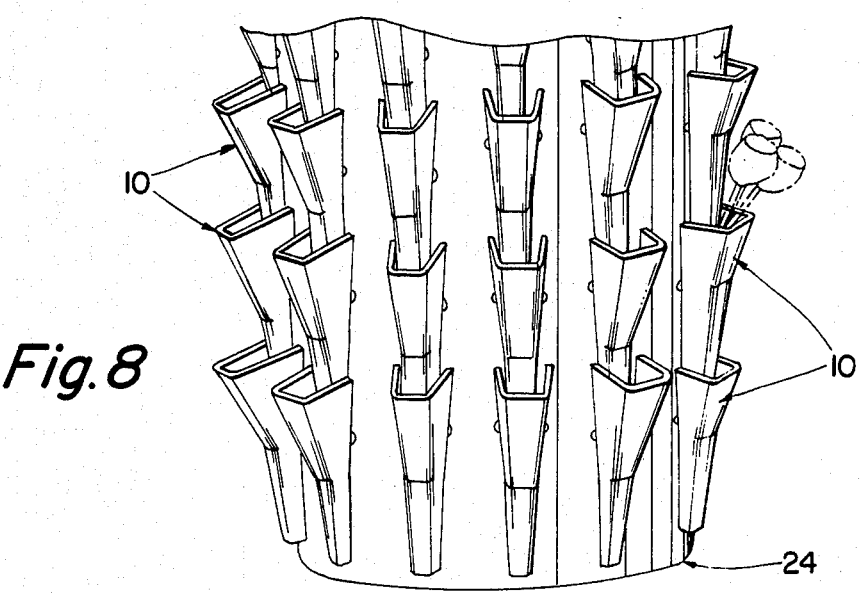
FIG. 8 is a perspective illustration showing a vase form constructed in accordance with FIG. 1 mounted to a cylindrical display board.
Figure 9:
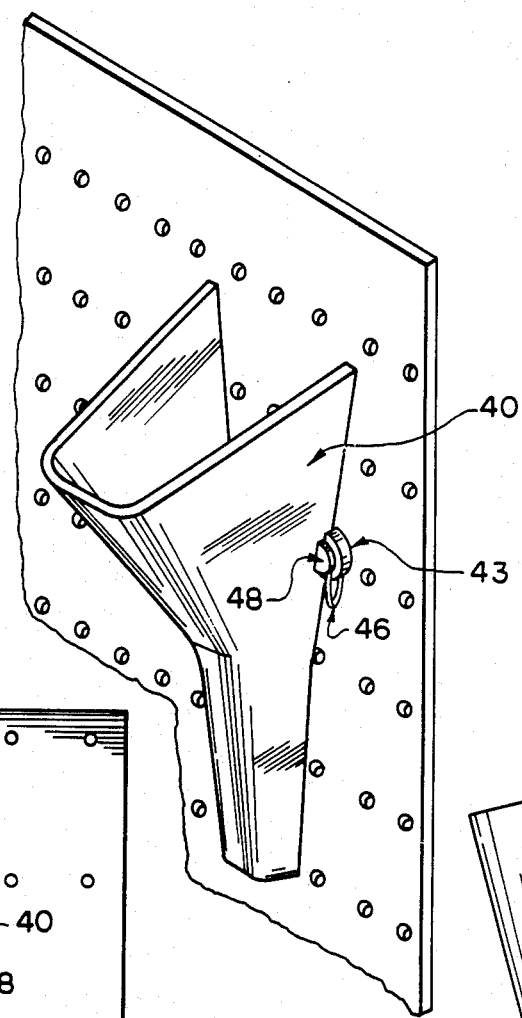
FIGS. 9–13 are views similar to FIGS. 1–5 but illustrating a modified type of vase form according to the principles of this invention.
Figure 10:
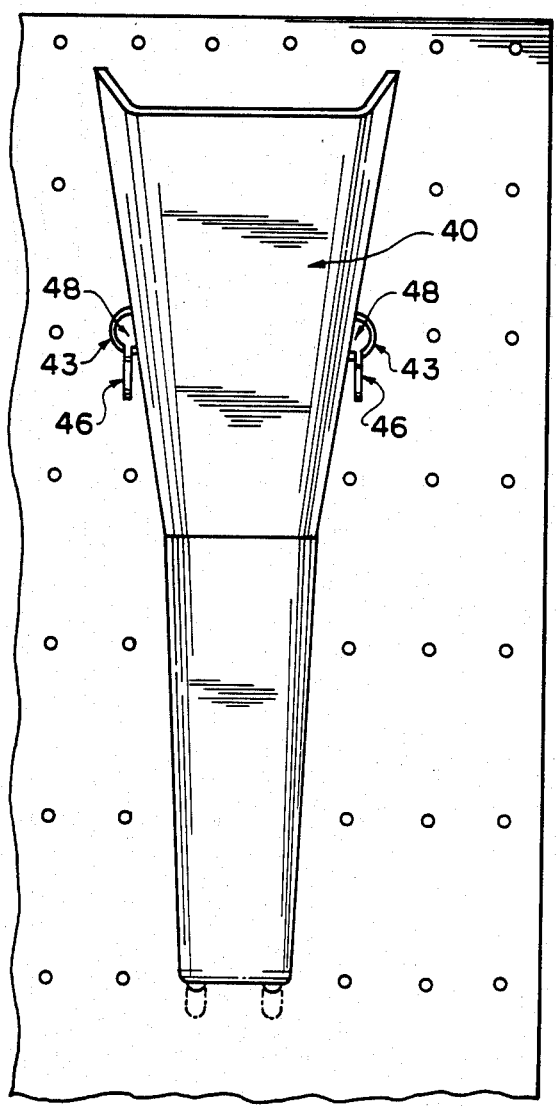
Figure 11:
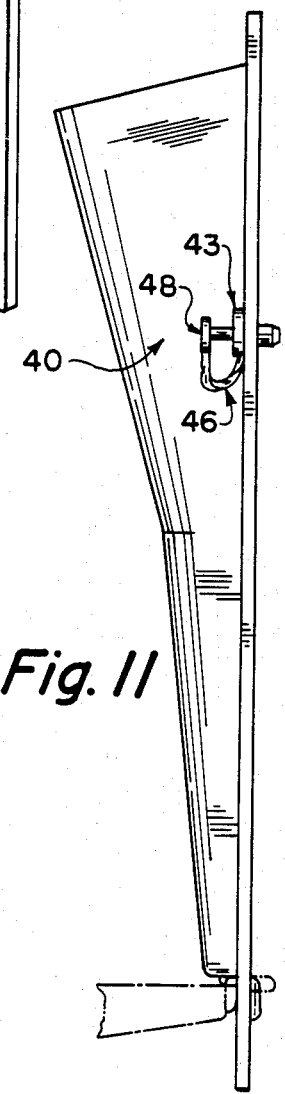
Figure 12:
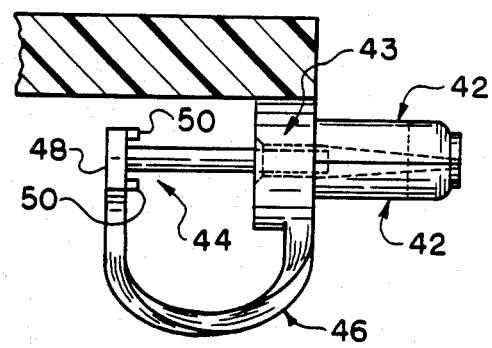
Figure 13:
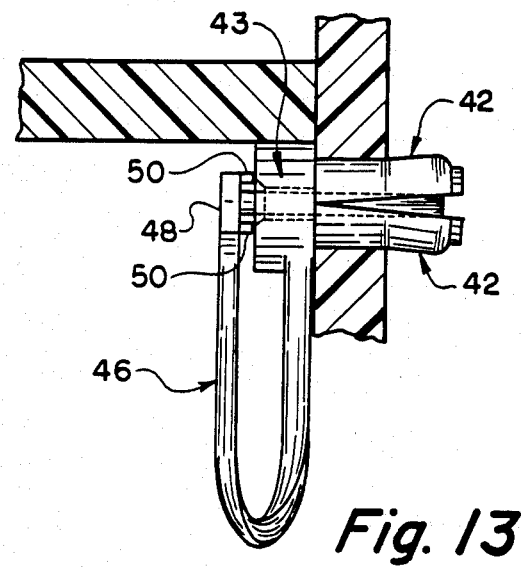

One advantage to the open back 15 (FIG. 1) is that the vase form 10 may be mounted on curved display boards such as the cylindrical display board shown at 24 in FIG. 8. A vase form with a closed back running its full length would not be as easy to bend to accommodate the configuration of a curved support surface such as stand 24. However, these difficulties could be overcome through the use of a back which closes the vase form only in its narrow lower portions, before the side portions 16 and 17 begin to flare away from each other.

The vase form 10 is fastened to pegboard 11 by a combination of hooks 25, 26 and fasteners 27, 28. The hooks 25, 26 are preferably L-shaped (FIG. 2) and extend rearwardly and downwardly from the bottom 13 of the vase form. Each of the hooks 25 and 26 is located at the bottom part 13 of the vase form. Preferably, the hooks 25 and 26 are integrally molded with the plastic vase form. The two hooks 25 and 26 are positioned and proportioned to engage a pair of perforations in a conventional pegboard and to hold the rearmost edges 20 and 21 of the vase form 10 flush against the front surface 11A of the pegboard 11. Thus, the horizontal leg 25A, 26A of each of the hooks, 25, 26 extends rearwardly a distance approximately equal to the thickness of the pegboard 11.

To install the vase form 10 on the pegboard 11, the vase form is first positioned horizontally, as shown in phantom in FIG. 3, and the legs 25A, 26A of the hooks, 25, 26 are inserted through holes in the pegboard by moving the vase form in the direction of arrow 29. Thereafter, the vase form is pivoted (clockwise as shown in FIG. 3) in the direction of arrow 30 until the rearmost edges 20 and 21 abut the front wall 11A of the pegboard 11. The downward leg 25B, 26B of each hook is long enough to prevent the hook and vase form from being pulled away from the pegboard 11 after the vase form has been installed except by reversing the installation procedure.

The fasteners 27 and 28 extend laterally from the rearmost edges 20 and 21 of the side portions 16 and 17, respectively, approximately two-thirds of the distance up the height of the vase form from the bottom 13. The fasteners 27 and 28 are mirror images of each other, and consequently only the fastener 27 will be described in detail, it being understood that the fastener 28 is similar.

Fastener 27 includes a laterally projecting tab 31 which is preferably molded with the plastic vase form and extends from the side portion 16 adjacent the rearmost edge 20 of the side wall 12. The tab 31 includes an array of relatively resilient fingers 32 (see FIG. 4) which are preferably integrally molded with the tab and the vase form. The array of resilient fingers 32 extends rearwardly from the rearmost edge 20 of the side portion 16. The array of resilient fingers 32 is proportioned and positioned to align with and fit through a perforation in the pegboard 11 (FIGS. 1–3). Its exact location, as well as the location of the hooks 25 and 26, is determined by the location of the perforations on the pegboard.

Figure 6:
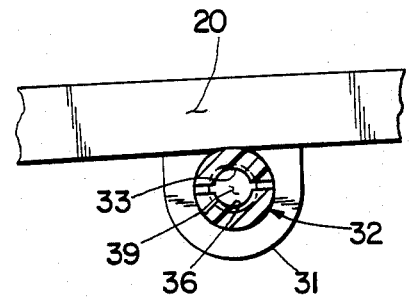
FIG. 6 is a view in the direction of arrows 6—6 of FIG. 4.

The tab 31 and the array of resilient fingers 32 have an internal passage 34 which circumscribes a central axis 33. The profile of the portion of the internal passage 34 in the tab 31 is shown at 35 and is generally cylindrical in cross section. The profile of the internal passage 34 becomes frustoconical and tapers inwardly toward the distal end of the resilient fingers, as shown schematically at 36 in FIGS. 4 and 6. The outer surface of the resilient fingers 32 includes tapering surfaces 37 at its distal end to facilitate insertion of the array of resilient fingers 32 through a perforation in a pegboard 11.

Figure 5:
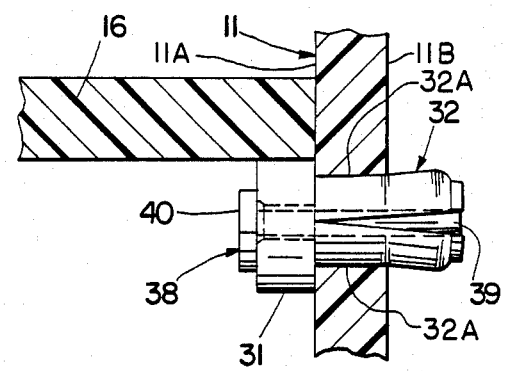
FIG. 5 is a view generally similar to FIG. 4 but showing an array of resilient fingers extending through a perforation in the display board and the camming pin pressed into an internal passage in the array of resilient fingers to secure the fastener to the display board.

The fastener 27 includes a relatively rigid camming pin 38 having a cylindrical shank 39 with an outside diameter approximately the same as, or just slightly greater than, the cylindrical portion 35 of the internal passage 34. This fit permits the camming pin 38 to be retained by friction when the pin penetrates only the cylindrical portion 35 of the internal passage 34. Once the hooks 25, 26 or the vase form 10 have been inserted through perforations in the pegboard and the base form is pivoted to the position shown in solid lines in FIG. 3, each array of the resilient fingers 32 is inserted into a respective perforation, and the associated pin 38 may be pressed axially until the pin 38 is fully inserted in the internal passage 34, and the head 40 of the pin abuts the tab 31 (FIG. 5). As seen in FIG. 5, the length of the shank 39 of the camming pin 38 and the length of the resilient fingers 32 both exceed the thickness of the pegboard 11. Thus, when the pin 38 is fully inserted in the internal passage 34, both the resilient fingers 32 and the shank 39 of the pin extend beyond the rear surface 11B of the Pegboard 11, and the distal end of the camming pin is accessible from the rear side of the pegboard.

The movement of the shank 39 through the tapered portion 36 of the passage 34 causes the resilient fingers 32 to separate from the central axis 33, as shown schematically in FIG. 5. The resultant separation of the fingers 32 causes the outer surface(s) of the fingers 32 to tightly engage the perforation, and to flare outward beyond the rear wall 11B of the pegboard. This provides a gripping action that retains the fastener 27 and the vase form against the pegboard 11 until the pin 38 is moved in the opposite direction in the internal passage 34. When the pin 38 is moved far enough in the opposite direction, the memory of the fingers causes them to return to an orientation in which they can be removed from the perforation. The vase form 10 may then be pivoted away from the pegboard 11, and then removed from the pegboard by unhooking the hooks 25, 26.

Figure 7:
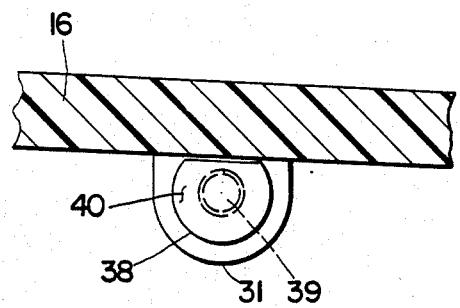
FIG. 7 is a view looking in the direction of arrows 7—7 of FIG. 4.

As discussed above, when the vase form 10 is attached to the pegboard, the distal ends of the pin 38 and the fingers 32 extend beyond the rear surface 11B of the pegboard. The distal end of the camming pin is accessible from the rear of the Pegboard, to enable its removal from the fastener to be initiated from the rear of the pegboard, if desired. Further, since the shank of the camming pin is cylindrical along its length, removal of the camming pin from the fastener does not require destruction of any part of the pin. Thus, the same camming pin can be repeatedly used to attach the vase form at different locations on the pegboard. Moreover, it should be apparent that the construction of the resilient fingers and the pin is designed to enable the pin to be completely detached from (i.e., separated from) the fastener, if desired. Additionally, as shown in FIG. 7, the head 40 of the pin 38 may be flattened along one side to accommodate the proximity of the side portion 16 of the side wall 12.

It should be clear from the foregoing discussion that the fingers 32 are resiliently deflectable relative to the shank 39 of the camming pin 38. More specifically, the fingers 32 are relatively resiliently deflectable in the sense that when the camming pin 38 is inserted into the internal passage 34, it is rigid enough to cause the fingers to deflect in the manner discussed above. Thus, in this application, reference to "relatively resilient" fingers and to a "relatively rigid" camming pin is designed to define their relative flexibility and/or rigidity in relation to each other.

Moreover, the camming pin 38 is preferably a molded plastic article, which can be molded from the same type of plastic used to mold the vase form. Also, it should be clear that the foregoing construction of the resilient fingers and the plastic pin enables the same plastic camming pin to be used to attach and reattach the vase form to different locations on the perforated display board.

Although the vase form 10 has been described in connection with a conventional pegboard 11 with a uniform array of perforations, it is also contemplated that the vase form 10 could be mounted on a support surface such as a cylindrical perforated display board 24 (FIG. 8) having perforations drilled only in those locations necessary to mount the vase form 10. In this case, the spacing of the perforations would depend upon the location of the tabs and fingers rather than the other way around.

FIGS. 9-13 illustrate a modified vase form constructed according to the principles of the present invention. In FIGS. 9-13, the vase form 40 is similar to the vase form of FIGS. 1-5, and includes integral fasteners with tabs 43 and resilient fingers 42 which are also similar to the tabs and resilient fingers of FIGS. 1-5. The vase form also includes a pin 44 which is similar to the pin of FIGS. 1-5, and that pin is integrally connected with the fastener by a plastic tether 46. The plastic tether 46 is integral with and extends from the tab 43 of the fastener to the head 48 of the pin 44. Preferably, the vase form 40, the resilient fingers 42, the tabs 43, the pins 44 and the tethers 46 are all molded as a single plastic unit. Also, the pin 44 may include an integral spacer member 50 protruding from one side of the head 48.

In the embodiment of FIGS. 9-13, the tether 46 permanently couples the pin 44 with the vase form 40. Thus, the risk of the pin being lost or misplaced is eliminated. Also, the tether 46 enables the pin 44 to be removed from the resilient fingers 42 by pulling on the tether 46 rather than pushing the distal end of the pin 44 from the back side of the board. Such a feature is particularly useful when the back side of the board is relatively unaccessible.

The spacer member 50 protrudes from the side of the pin head 48 which faces the tab 43 associated with the pin. The spacer member 50 maintains the pin head 48 spaced from the tab 43 by at least a predetermined distance, even when the vase form is coupled to the display board. The space enables a person to conveniently grasp the pin head 48 in order to release the pin from the fastener.

Thus, the foregoing disclosure provides a new and useful vase form for attachment to a perforated display board. With the foregoing disclosure in mind, it is believed that various obvious modifications of the concepts of this disclosure will become apparent to those of ordinary skill in the art.

What is claimed is:

1. A vase form adapted to be releasably attached to a perforated display board; said vase form having side wall means enveloping a predetermined circumferential extent, a bottom wall and an open top; said vase form defining an open side adapted to abut the display board to complete an enclosure for an article of merchandise; means for releasably attaching the vase form to the display board comprising relatively resilient finger means integral with said vase form and located for insertion into a perforation in the display board and a relatively rigid camming-pin moveable in a first direction against a portion of the resilient finger means for forcing at least part of said resilient finger means into locking engagement with the perforation; said camming pin being moveable in a second direction relative to the resilient finger means in a manner that releases the resilient finger means from locking engagement with the perforation and enables the vase form to be released from the display board.

2. A vase form as defined in claim 1, wherein said resilient finger means includes a plurality of resilient fingers defining an internal passage with a central axis, said camming pin being moveable in said first and second directions in the internal passage, said plurality of fingers having memories biasing them inwardly toward the central axis, said plurality of fingers being resiliently urged outwardly and into locking engagement with the perforation when the camming pin is moved in said first direction in the internal passage, and the fingers being allowed resiliently to return toward the central axis when the camming pin is moved in said second direction in the internal passage.

3. A vase form as defined in claim 2 wherein the plurality of fingers circumscribe said central axis, the fingers having inside walls with distal ends which taper toward the central axis, and the camming pin having a cylindrical outer periphery circumscribing the central axis.

4. A vase form as defined in claim 3 wherein the length of the resilient fingers is greater than the thickness of the display board and the length of the camming pin is greater than the thickness of the display board, the distal end of the camming pin being located between the resilient fingers when the camming pin has been fully inserted between the fingers and being accessible from the rear side of the display board to enable the camming pin to be moved in the second direction.

5. A vase form as defined in claim 4 wherein said camming pin can be moved far enough in said second direction to enable said camming pin to be separated from the resilient fingers.

6. A vase form as defined in claim 5 wherein the resilient finger means are connected with one portion of the vase form and an integral hook means is connected with another point of the vase form, said integral hook means being adapted to engage a perforation in the display board and to maintain the one part of the vase form against the display board while the resilient finger means and the camming pin are attaching the other part of the vase form with the display board.

7. A vase form as defined in claim 6 wherein said vase form and said camming pin are each made of molded plastic and said resilient finger means are integrally molded parts of said side wall means of said vase form.

8. A vase form as defined in claim 7 wherein said hook means are integrally molded with said vase form.

9. A vase form as defined in claim 2 wherein said camming pin can be moved far enough in said second direction to enable said camming pin to be separated from the resilient fingers.

10. A vase form as defined in claim 9 further including a tether permanently connecting said camming pin with a portion of said vase form to permanently connect said camming pin with said vase form when said camming pin has been separated from said resilient fingers 11. Apparatus comprising a display board comprising a support wall with parallel front and back surfaces, a plurality of perforations extending completely through said support wall, and a vase form attached to said support wall and which combines with a portion of said front surface to complete a display vase for an article of merchandise, means for releasably attaching the vase form to the display board comprising relatively resilient finger means integral with said vase form and located for insertion into a perforation in the display board and a relatively rigid camming pin moveable in a first direction against a portion of the resilient finger means for forcing at least part of said resilient finger means into locking engagement with the perforation, said camming pin being moveable in a second direction relative to the resilient finger means in a manner that releases the resilient finger means from locking engagement with the perforation and enables the vase form to be released from the display board.

12. Apparatus as defined in claim 11, wherein said resilient finger means includes a plurality of resilient fingers defining an internal passage with a central axis, said camming pin being moveable in the internal passage, said plurality of fingers having memories biasing them inwardly toward the central axis, said plurality of fingers being resiliently urged outwardly and into locking engagement with the perforation when the camming pin is moved in said first direction in the internal passage, and the fingers being allowed resiliently to return toward the central axis when the camming pin is moved in said second direction in the internal passage.

13. Apparatus as defined in claim 12 wherein the plurality of fingers circumscribe said central axis, the fingers having inside walls with distal ends which taper toward the central axis, and the camming pin having a cylindrical outer periphery circumscribing the central axis.

14. Apparatus as defined in claim 13 wherein the length of the resilient fingers is greater than the thickness of the display board and the length of the camming pin is greater than the thickness of the display board, the distal end of the camming pin being located between the resilient fingers when the camming pin has been fully inserted between the fingers and being accessible from the rear side of the display board to enable the camming pin to be moved in the second direction.

15. Apparatus as defined in claim 14 wherein said camming pin can be moved far enough in said second direction to enable said camming pin to be separated from the resilient fingers and detached from the vase form.

16. Apparatus as defined in claim 15 wherein the resilient finger means are connected with one portion of the vase form and an integral hook means is connected with another point of the vase form, said integral hook means being adapted to engage a perforation in the display board and to maintain the one part of the vase form against the display board while the resilient finger means and the camming pin are attaching the other part of the vase form with the display board.

17. Apparatus as defined in claim 16 wherein said vase form and said camming pin are each made of molded plastic and said resilient finger means are integrally molded parts of said side wall means of said vase form.

18. Apparatus as defined in claim 15 wherein said camming pin can be moved far enough in said second direction to enable said camming pin to be separated from the resilient fingers and detached from the vase form.

19. Apparatus as defined in claim 15 further including a tether permanently connecting said camming pin with a portion of said vase form to permanently connect said camming pin with said vase form when said camming pin has been separated from said resilient fingers.

* * * * *